United States Patent [19]

Albertson et al.

[11] 4,409,298
[45] Oct. 11, 1983

[54] CASTABLE METAL COMPOSITE FRICTION MATERIALS

[75] Inventors: Clarence E. Albertson, Villa Park; John A. Horwath, Palatine, both of Ill.; Duane W. Lashua, Brillion, Wis.

[73] Assignee: Borg-Warner Corporation, Chicago, Ill.

[21] Appl. No.: 400,318

[22] Filed: Jul. 21, 1982

[51] Int. Cl.$^3$ .............................................. B22D 19/00
[52] U.S. Cl. .................................. 428/614; 75/10 R; 75/123 R; 420/528; 428/37
[58] Field of Search .................... 428/614, 37; 75/122, 75/123 R, 135, 10 R; 420/528

[56] References Cited

U.S. PATENT DOCUMENTS

| | | | |
|---|---|---|---|
| 2,793,949 | 5/1957 | Imica | 420/528 |
| 3,468,658 | 9/1969 | Herald et al. | 75/123 R |
| 3,951,651 | 4/1976 | Mehrabian et al. | 75/10 R |
| 4,244,994 | 1/1981 | Trainor et al. | 428/37 |

OTHER PUBLICATIONS

R. Mehrabian et al. Prep and Casting of Metal–Particulate Non–Metal Composites, 1974, Metallurgical Transactions, 5, 1800–1905.
F. A. Badia, Dispersion of Oxides and Carbides in Al and Zn Alloy Castings, 1971, AFS Transactions, 79, 347–350.
R. Mehrabian et al. Die Castings of Partially Solidified Alloys, 1972, AFS Transactions, 80, 173–182.
M. C. Flemings, et al.–Casting Semi–Solid Metals, 1973, AFS Transactions 81, 81–88.

Primary Examiner—Veronica O'Keefe
Attorney, Agent, or Firm—Richard J. Schlott

[57] ABSTRACT

Metal composites comprising a metallic matrix and discrete, non-metallic solid particles are useful as friction materials, and may be die-cast to form friction elements. The preferred metallic matrix components are alloys containing aluminum such as aluminum-silicon and aluminum-silicon-zinc alloys.

3 Claims, No Drawings

CASTABLE METAL COMPOSITE FRICTION MATERIALS

BACKGROUND OF THE INVENTION

This invention relates to metal composite friction materials and more particularly metal composites comprising a metallic continuous phase or matrix having dispersed therein discrete non-metallic particulate components, said composites being suitable for use as friction materials, and to a method for the preparation thereof. The composites may be die-cast to form friction elements such as brake pads and the like, or cast onto the driven member of a clutch mechanism to provide the friction element therein.

Asbestos has long been the principal component of friction elements used in the clutch and brake assemblies where severe operating temperatures and pressures occur. However, due to the accumulating evidence that asbestos may be carcinogenic to man, major efforts have been made to develop alternative friction materials which do not depend upon asbestos for their frictional properties and resistance to extreme temperatures. The more recent friction materials developed as replacements for the asbestos based compositions have employed a variety of glass fibers and infusible organic fibers embedded in a heat-curable organic binder. To provide increased mechanical strength and resistance to disintegration in response to centrifugal forces (burst strength), these materials have included therein continuous glass and/or infusible organic fiber. Fabrication of these materials, particularly when used in the manufacture of clutch facings, has been accomplished by first forming a continuous tape or strand, winding the tape to form a disc preform, then molding and curing the preform under heat and pressure to provide the clutch facing, as is shown for example in U.S. Pat. No. 4,244,994. Although suitable asbestos-free friction elements are provided by such processes, the complexity and cost factors are somewhat limiting. Further, the presence of organic binders precludes the use of these materials under extremely severe conditions wherein very high temperatures are encountered. The thermal deterioration of the binders in severe environments and/or under abuse results in inferior frictional characteristics and often results in increased wear.

Various sintered metal and ceramic compositions have been developed as frictional materials for use under severe conditions. In general, these materials comprise sintered lead bronzes or iron powders with friction reinforcers and dry lubricants. Among the additives commonly employed with the powdered metals are graphite, quartz, corundum, aluminum oxide, silica, mullite and the like. The sintered compositions or composites are generally formed by blending the powdered metals with the powdered or particulate non-metallic component, then compressing the powder in a mold at pressures of from 10,000 to 100,000 psi to provide a pressed wafer. The wafer is then sintered under pressure at elevated temperatures for extended periods to fuse the metallic component and entrap the non-metallic ingredients. The compressed wafer prior to being sintered is fragile and easily broken if mishandled during manufacture. Further, the sintered composite friction element is generally porous and has rather low mechanical strength. It has therefore been necessary to provide additional strengthening means in order to overcome these inherent deficiencies. For example, the friction element may be attached to a steel backing, normally by brazing, prior to the sintering operation to overcome the fragility of the compressed wafer and to add strength to the sintered friction element. Various organic binders such as coal tar pitch may be added to provide green strength to the wafer and thus avoid breakage of the fragile wafer during the sintering operation. Alternatively, monolithic friction elements having a layered structure comprising a first friction layer with appropriate friction and wear properties and second layer united thereto as a backing of adequate mechanical strength may be made by forming the element simultaneously from two powdered layers.

The sintering process thus lends itself to the production of a wide variety of metallic composites for use in most frictional materials applications. However, the weight of sintered metallic friction materials as compared with those formed from glass fiber and resin binders, together with the high cost of manufacturing the sintered composites have restricted their use and have mitigated against the wide spread adoption for use in large volume applications such as in passenger vehicles. A simplified, low cost method for the manufacture of lighter weight metallic composite friction materials would thus advance the development of asbestos-free friction elements.

SUMMARY OF THE INVENTION

The instant invention is a metal composite friction material comprising a metallic matrix and discrete non-metallic components and a method for the preparation thereof. Unlike the sintered composites, the friction materials of this invention comprise a continuous metallic matrix which imparts a substantial improvement in mechanical strength to the resulting friction element, thus avoiding the need for added strengthening means. Although the metal composite friction materials of this invention may be formulated from any of a variety of metals or metal alloys, the use of low density metals or metal alloys will permit a substantial reduction in weight over the prior art sintered composites.

DETAILED DESCRIPTION

The metal composite friction materials prepared by the method of this invention comprise a metal or metal alloy matrix containing solid particles homogeneously distributed within the matrix. The metal matrix can be formed from any of the wide variety of metals or alloys which when frozen from the liquid state without agitation forms a dendritic structure. Representative alloys include aluminum alloys, zinc alloys, magnesium alloys, copper alloys, iron alloys and the like. Preferred for their lower densities and concommitant reduction in weight are alloys containing aluminum, including, for example, aluminum-zinc alloys, aluminum-silicon alloys, and aluminum-silicon-zinc alloys.

The solid particle component of the metal composite can be one or more solid compositions normally added to sintered frictional materials for the purpose of changing one or more physical characteristics and in particular to effect modification of the surface characteristics including frictional properties, wear properties and the like. The solid particle components will have a surface composition which is not wet by the metal matrix when liquid. As employed herein, a composition that is not wetted by the matrix refers to compositions that, when added to a metal or metal alloy at or slightly above the liquidus temperature of the matrix metal and mixed therein, are not retrained homogeneously in measurable concentrations within the liquid after mixing has ceased and the mixture has returned to a quiescent, liquid state. Representative particles suitable for the purposes of this invention include graphite, metal carbides such as tungsten carbide, sand, glass, ceramics, metal oxides such as alumina, and the like.

The compositions may further comprise other particulate additives such as solid lubricant materials, surface coated particles wettable by the molten matrix metal such as nickel coated graphite and the like.

The metal composite friction materials of this invention will thus comprise a metal matrix, preferably formed of an alloy containing aluminum, and at least one solid particulate component having a surface composition which is not wet by the metal matrix when liquid, said solid particulate component being homogeneously dispersed within the metal matrix. The composition will comprise from 99 to about 85 wt% of the metal matrix and correspondingly from about 1 to 15 wt% of the said solid particle component.

A process for combining matrix metals and nonwettable particulate components has been recently developed. As is well known in the art, compositions comprising a molten metallic component and one or more solid, particulate components which are not adequately wetted by the molten metal readily separate in the melt. However, as is disclosed in *Metallurgical Transactions* 5, 1899–1905 (1974) and in U.S. Pat. No. 3,951,651, rejection of the particulate materials by the metallic component can be overcome by adding the particulate components to a vigorously stirred slurry of partially solidified alloy. The slurry nature of the mixture maintains the particulate components homogeneously dispersed within the metal matrix, and the composition can be cast to form solid metallic composites comprising a metal matrix having uniform dispersion of the particulate components.

The process for making metal matrix composites is set forth and described in greater detail in U.S. Pat. No. 3,951,651, the teachings of which are incorporated herein by reference. In general terms, the process includes the steps of (a) heating a metal alloy to form a liquid-solid mixture, (b) vigorously agitating said liquid-solid mixture to convert the solid to discrete degenerate dendrites derived from said metal alloy, said degenerate dendrites comprising up to about 15 weight percent of the heated metal alloy, the remainder of the metal alloy being liquid, (c) adding solid particles having a composition different from said alloy and having a surface composition that is not wet by the molten alloy to said heated metal alloy; and (d) dispersing said solid particles homogeneously in said heated metal alloy. It will be understood that further additives and particulate materials having a wettable surface may also be added to the composition either simultaneously with the solid particulate material addition in step (c) or with agitation in a subsequent step.

The resulting composition may be then formed into a friction element by permanent mold casting into a suitable mold or by a die casting operation.

Alternatively, the composition may be cast into ingots for storage. The ingots may be re-heated to the liquid-solid state and die-cast without significant loss in the homogeneity of the dispersion.

The practice of this invention will be better understood by consideration of the following Examples.

EXAMPLE 1

A composition comprising aluminum-silicon-zinc alloy as the metal matrix and containing powdered soft glass, powdered alumina and nickel plated graphite powder was prepared by first preparing a molten mass of aluminum-silicon-zinc alloy (Al:Si:Zn=31:7:56) in a heated graphite crucible, slowly cooling the alloy while stirring with a hand-held stainless steel impeller mixer until a solid-liquid slurry formed, then adding powdered soft glass, 2.5 wt%, powdered alumina, 1 wt%, and nickel-coated graphite powder, 2.5 wt% (Ni:C=1:1), while continuing the vigorous stirring under isothermal conditions for 30 min. The composition was cast into a carbon mold having a 1½" diameter round cavity and cooled to form a test billet. The billet was sectioned into a 1"×1"×¼" square for testing.

EXAMPLES 2–4

A series of 3 additional aluminum alloy matrix composites were prepared substantially by the process of Example 1 and prepared for testing. Friction and wear tests were made with a Chase machine. The specimen was mounted in the fixture and worn-in against the rotating cast iron brake drum under a load of 50 psi for approximately 20 min., until the sample conformed to the brake drum surface. After this wear-in cycle, the lining was run against the drum rotated at 940 rpm at a constant 5 psi friction force while the sample was heated to 575° F. over a ½ hr. period, run at 575° F. for ½ hr., then cooled to room temperature, again over a 30 min. period. The controlled load needed to maintain the constant 5 psi frictional force was recorded over the test period, and the sample wear was measured at the end of the 90 min. test.

The compositions of Examples 1–4 and the friction and wear characteristics are summarized in Table I, together with the properties for control Example A measured under the same conditions for comparative purposes. Control Example A is a commercial asbestos-filled organic resin friction material, obtained from Raybestos and designated as Veelock 969Y.

TABLE 1

| Ex No | Composition (1) (wt %) | | Friction (2) Coeff (U) | wear in/in | Remarks |
|---|---|---|---|---|---|
| 1. | 56.25 | Zn | 0.32 | 0.0047 | sparks during testing |
|  | 31.0 | Al |  |  |  |
|  | 7.0 | Si |  |  |  |
|  | 2.5 | Ni:C (1:1) |  |  |  |
|  | 2.5 | glass |  |  |  |
|  | 1.25 | alumina |  |  |  |
| 2. | 73.8 | Al | 0.24 | 0.041 | chatter, galling, sparking; test stopped at 70 min. |
|  | 16.2 | Si |  |  |  |
|  | 5 | Ni:C (1:1) |  |  |  |
|  | 2.5 | glass |  |  |  |
|  | 2.5 | alumina |  |  |  |
| 3. | 75.85 | Al | 0.195 | 0.0491 | chatters, galling test stopped at 70 min. |
|  | 16.65 | Si |  |  |  |
|  | 5 | Ni:C (1:1) |  |  |  |
|  | 2.5 | alumina |  |  |  |
| 4. | 81.75 | Al | N.D. | N.D. | chatter, galling, test stopped at 7.5 min. |
|  | 4.25 | Si |  |  |  |
|  | 10 | Ni:C (1:1) |  |  |  |
|  | 5 | alumina |  |  |  |
| A. | Raybestos | | 0.40 | 0.0095 |  |

TABLE 1-continued

| Ex No | Composition (1) (wt %) | Friction (2) Coeff (U) | wear in/in | Remarks |
|---|---|---|---|---|
| | Veelock 969Y | | | |

Notes:
(1) Compositions 1-3 prepared from Al—Si (82:18) alloy;
Composition 4 prepared from Al—Si (95:5) alloy;
N.D. = not determined;
Ni:C = Nickel-coated graphite, 1:1 wt. ratio.
(2) Ave coeff of friction over test period. For details see text.

It will be apparent from these data that a metal composite frictional material comprising an alloy metal matrix and at least one solid particulate material homogeneously dispersed therein and having a surface composition which is not wet by the metal matrix will exhibit useful friction and wear properties. The composition of Example 1, containing powdered glass, alumina and nickel-coated graphite dispersed in an aluminum-silicon-zinc alloy exhibited good friction characteristics, and wear properties better than that of the resin-based composition (A). Although the composition based on aluminum-silicon alloy, Examples 2 and 3 exhibited chatter, galling and wear sufficient to stop the test at 70 min., these compositions fared considerably better than an aluminum-silicon alloy composition containing a high percentage of aluminum shown in Example 4.

As will be noted from a consideration of the friction and wear properties of Examples 1-4, high levels of aluminum contribute to increased wear and lower the friction coefficient below a useful value of about 0.2. Although such materials may have some utility in low-load applications, only compositions containing less than about 80 wt% and preferably less than about 75 wt% aluminum based on the total composition will have practical application.

The invention will thus be seen to be a metal composite friction material comprising a metal matrix and at least one solid particulate component homogeneously dispersed therein having a surface composition which is not wet by the metal matrix when liquid, and a method for making metal composite friction materials.

We claim:

1. A metal composite friction material having an average dynamic coefficient of friction greater than 0.2 comprising from 99 to 85 wt% of a metal matrix and correspondingly from about 1 to about 15 wt% of at least one solid particulate component having a surface composition which is not wet by the metal matrix when liquid, said metal matrix formed of an alloy of aluminum containing no more than 80 wt% aluminum and selected from the group consisting of aluminum-silicon alloy, aluminum-silicon-zinc alloy and aluminum-zinc alloy, and said solid particulate component being homogeneously dispersed within said metal matrix.

2. The metal composite friction material of claim 1 wherein the solid particulate component is selected from the group consisting of graphite, glass, alumina, tungsten carbide, silica and ceramic.

3. The metal composite friction material of claim 1 wherein said metal matrix is formed from an aluminum-silicon-zinc alloy.

* * * * *